March 27, 1956     A. F. KOESTER, SR     2,739,404
FISHING LINE RETRIEVER
Filed April 2, 1954
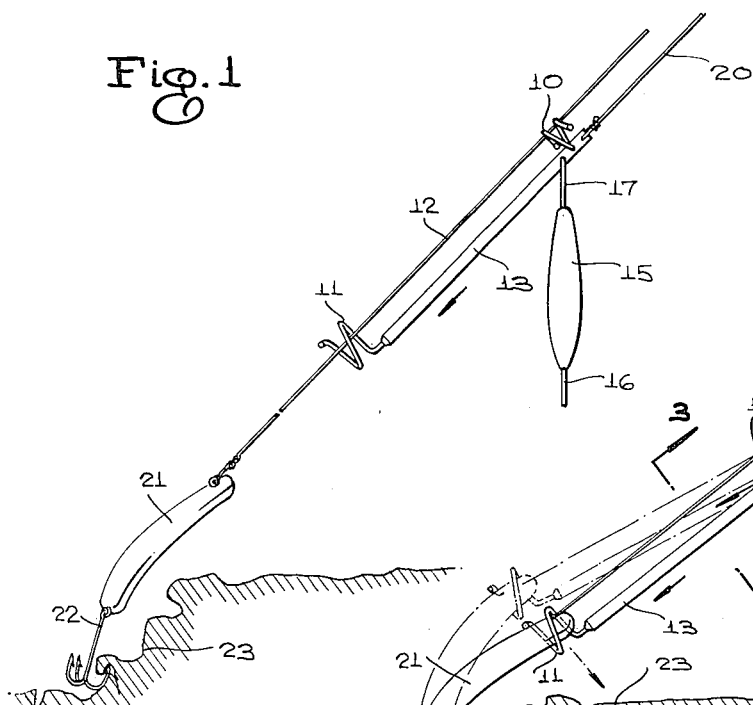
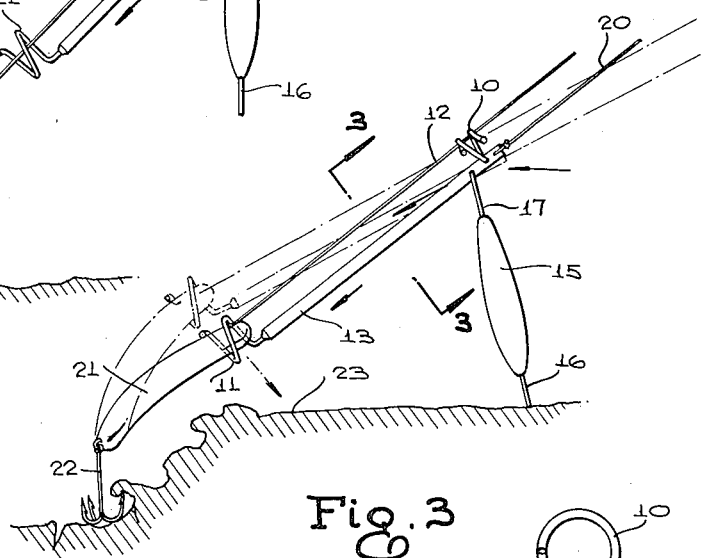
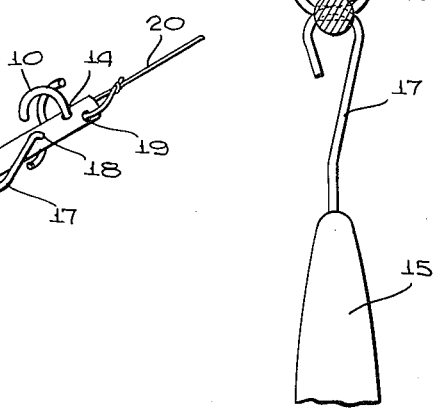
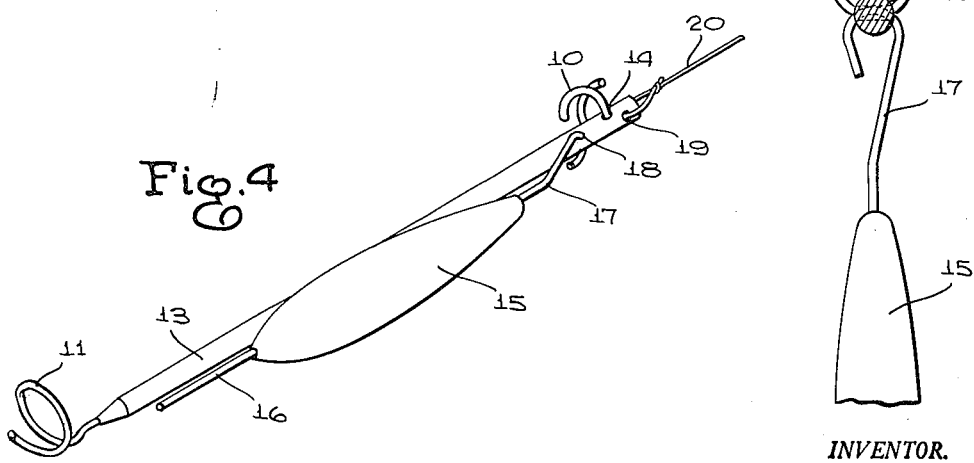
*INVENTOR.*
ARTHUR F. KOESTER, SR
BY
*McMorrow, Berman & Davidson*
ATTORNEYS

United States Patent Office 2,739,404
Patented Mar. 27, 1956

2,739,404

FISHING LINE RETRIEVER

Arthur F. Koester, Sr., Wyandotte, Mich.

Application April 2, 1954, Serial No. 420,592

3 Claims. (Cl. 43—17.2)

This invention relates to devices for disengaging and retrieving snagged fishing lines.

An object of the invention is to provide an improved fishing line retriever which may be sent down a snagged line to a point adjacent that at which the line is snagged and will there serve as a means by which the line may be moved into a variety of positions to disengage it from the snag.

Another object of the invention is to provide a fishing line retriever which may be more easily mounted upon and dismounted from a fishing line.

Other objects and advantages of the invention will appear from the following description considered in conjunction with the attached drawings, in which:

Figure 1 is a side elevational view of a retriever of the present invention mounted upon a snagged fishing line and moving toward the location of the snag.

Figure 2 is a view of the assembly of Figure 1 with the retriever in the disengaging position.

Figure 3 is a view taken along the line 3—3 of Figure 2, on an enlarged scale.

Figure 4 is a perspective view of said retriever on an enlarged scale.

Referring now to the drawing in more detail, the illustrated device comprises a pair of spaced coils 10 and 11, each adapted to surround and slide along a snagged fishing line 12. Each of the coils 10 and 11 consists of a single turn and has free ends. A bar 13 extends between the coils 10 and 11, being connected, adjacent its upper end to an intermediate portion of the coil 10 and having its lower end connected to one of the free ends of the coil 11. The coil 10 extends through a transversely extending aperture 14 in the upper end portion of the bar 13 and the coil 11 is fixedly secured at one of its ends, by welding or other appropriate means, to the tapered lower end of the bar 13. The coils 10 and 11 are laterally offset from the bar 13 and are arranged in substantially axial alignment and are looped around the snagged fishing line 12 so as to connect the bar 13 to the line 12, in substantially parallel, spaced relation thereto, for sliding movement therealong.

An elongated, weighted member 15 has one end dependingly connected to the bar 13, adjacent its upper end, and has the other end provided with a piercing element 16. The member 15 is connected to the bar 13 by means of a hook 17, formed in its upper end, which hook 17 is engaged in an aperture 18 extending transversely through the bar 13, adjacent its upper end. The piercing element 16 consists of a short bar or length of rigid wire extending outward longitudinally at the other end of the member 15.

The upper end of the bar 13 is provided with means, consisting of a transversely extending aperture 19 for the connection thereto of the end of a control line 20.

To use the retriever of the present invention to disengage a snagged fishing line, the coils 10 and 11 are looped about the line 12 so that they are slidably supported upon it and carry the bar 13 in parallel spaced relation with respect to the line 12 for sliding movement therealong, as shown in Figure 1. The free end of the control line 20 is held in the hand of the fisherman and the retriever is allowed to run down the snagged line 12 to the point at which the snag is located. As shown in Figure 2, a lure 21 and a hook 22 are connected on the lower end of the line 12, the hook 22 being caught in a snag in the bottom 23 of a body of water in which the fishing is being done. The retriever is allowed to descend along the line 12 until the piercing element 16 at the lower end of the depending member 15 strikes and pierces the bottom surface 23 of a stream or lake adjacent the snag. The coil 11 is of sufficient diameter to pass over the lure 21 so as to permit the piercing element 16 to reach the bottom surface. When the piercing element 16 is firmly implaced in the bottom surface 23, the member 15 acts as a pivot for the bar 13 and when the fishing line 12 and the control line 20 are moved sharply up and down and from side to side, the pivotal movement of the bar 13 causes the portion of the fishing line 12 and tackle adjacent the snag to move into various positions out of the customary alignment with the fishing line 12, as shown in the broken lines in Figure 2, thus freeing the engaged portion from the snag. When the line has been freed, the retriever may be quickly drawn out by means of the control line 20 and quickly and easily detached from the fishing line.

What is claimed is:

1. In a device for freeing a snagged fishing line, an elongated bar having a forward end and a rearward end, a forward coil on said bar at said forward end, a rearward coil on said bar at said rearward end, said coils being laterally offset from said bar and in axial alignment with each other, and laterally projecting surface engaging means on said bar between said coils, said surface engaging means being elongated and having an inner end pivoted to said bar and a free outer end, and a surface piercing element on said free end.

2. In a device for freeing a snagged fishing line, an elongated bar having a forward end and a rearward end, a forward coil on said bar at said forward end, a rearward coil on said bar at said rearward end, said coils being laterally offset from said bar and in axial alignment with each other, and laterally projecting surface engaging means on said bar between said coils, said surface engaging means being elongated and having an inner end pivoted to said bar and a free outer end, and a surface piercing element on said free end, said surface engaging means having weighting means intermediate its ends.

3. In a device for freeing a snagged line, an elongated straight bar having a forward end and a rearward end, a forward coil on said forward end, a rearward coil on said rearward end, said coils being laterally offset from said bar and being in axial alignment with each other, and laterally projecting surface engaging means comprising an elongated straight member having a first end pivoted to said bar at a point intermediate the ends of the bar and a second free end for engaging a surface.

References Cited in the file of this patent

UNITED STATES PATENTS

| | | |
|---|---|---|
| 892,730 | Immel | July 7, 1908 |
| 2,316,500 | Bray | Apr. 13, 1943 |
| 2,553,173 | Consolo et al. | May 15, 1951 |
| 2,589,715 | Lysikowski | Mar. 18, 1952 |
| 2,609,632 | Davis | Sept. 9, 1952 |

FOREIGN PATENTS

| | | |
|---|---|---|
| 617,392 | Great Britain | Feb. 4, 1949 |